United States Patent
Lyu et al.

(10) Patent No.: US 10,466,133 B1
(45) Date of Patent: Nov. 5, 2019

(54) DEVICE FOR REMOVING VALVE HOLE SEALING SUBSTITUTE FROM HUB

(71) Applicant: CITIC DICASTAL CO., LTD, Qinhuangdao, Hebei (CN)

(72) Inventors: Jinqi Lyu, Hebei (CN); Zhipeng Li, Hebei (CN); Zhigao Yin, Hebei (CN); Yongning Wang, Hebei (CN); Zhihua Zhu, Hebei (CN); Chunhai Liu, Hebei (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/266,870

(22) Filed: Feb. 4, 2019

(30) Foreign Application Priority Data

Mar. 29, 2018 (CN) .......................... 2018 1 0271124

(51) Int. Cl.
*G01N 21/00* (2006.01)
*G01M 3/02* (2006.01)
*G01B 11/00* (2006.01)

(52) U.S. Cl.
CPC ........... *G01M 3/022* (2013.01); *G01B 11/002* (2013.01)

(58) Field of Classification Search
CPC ......... G01M 3/00; G01M 3/025; G01B 11/00; B64C 11/06; B64C 11/38; B60K 1/04; B60L 11/18; B23C 3/12; B24B 9/04
See application file for complete search history.

(56) References Cited

U.S. PATENT DOCUMENTS

2016/0354892 A1* 12/2016 Xue ........................ B60C 29/02

* cited by examiner

*Primary Examiner* — Abdullahi Nur
(74) *Attorney, Agent, or Firm* — Price Heneveld LLP

(57) ABSTRACT

A device for removing a valve hole sealing substitute from a hub includes an industrial camera, a removal manipulator, a rotary encoder, a rotary spindle, a processor, a frame and a console, wherein the console is installed on the frame, the console is connected to a production line by a roller bed, a color identification camera and the industrial camera are respectively installed on the frame and aligned with the console, the rotary spindle is installed below the console and configured to drive the hub above the console to rotate, and the removal manipulator is arranged above the console. The device and method solve the problem of relying on personnel to remove the valve hole sealing substitute, improve the labor productivity, and improve the automation of the hub production process.

7 Claims, 1 Drawing Sheet

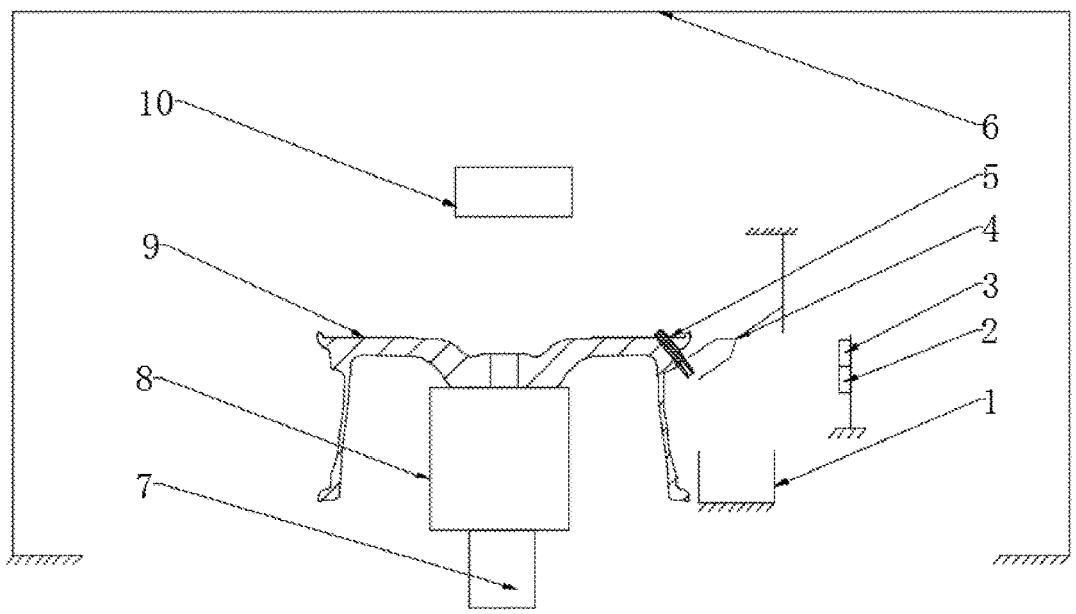

DEVICE FOR REMOVING VALVE HOLE SEALING SUBSTITUTE FROM HUB

CROSS REFERENCE TO RELATED APPLICATION

This application claims priority to Chinese Patent Application No. 201810271124.1, entitled DEVICE FOR REMOVING VALVE HOLE SEALING SUBSTITUTE FROM HUB and filed on Mar. 29, 2018, which is incorporated herein by reference for all purposes.

FIELD OF THE INVENTION

The present invention relates to a device and a method for automatically removing an aluminum alloy hub valve hole sealing substitute.

BACKGROUND OF THE INVENTION

Airtightness detection is required after hub machining to identify airtightness rejects. The valve hole of a hub needs to be sealed with a valve hole sealing substitute before an airtightness detection, then the airtightness detection is performed in an airtightness tester, and the valve hole sealing substitute is removed after the detection.

Because the machined aluminum alloy hub is gray, the position of the black hub valve hole sealing substitute used can be accurately identified by a color identification camera.

The previous installation and removal of the valve hole sealing substitute are completed manually, which belongs to simple and repeated operation, has the problem of low manual operation efficiency, and may also cause the phenomenon of missing removal to increase the production cost. Therefore, it is necessary to design a device to automatically remove the hub valve hole sealing substitute so as to improve the production efficiency and reduce the labor cost.

SUMMARY OF THE INVENTION

Accordingly, an object of the present invention is to provide a device for removing a valve hole sealing substitute, which can automatically and quickly remove the valve hole sealing substitute after an airtightness detection, thereby reducing the waiting time of manual operation and avoiding the cost increase caused by circulation of the valve hole sealing substitute to next procedure due to misoperation of an operator.

In order to achieve the above object, the present invention provides the following technical solution: a device for removing a valve hole sealing substitute from a hub, comprising an industrial camera, a removal manipulator, a rotary encoder, a rotary spindle, a processor, a frame and a console, wherein the console is installed on the frame, the console is connected to a production line by a roller bed, a color identification camera and the industrial camera are respectively installed on the frame and aligned with the console, the rotary spindle is installed below the console and configured to drive the hub above the console to rotate, and the removal manipulator is arranged above the console.

The rotating spindle is configured to drive the hub to rotate, the industrial camera is configured to take a photo from the front of the hub and transmit the photo to the processor, and the processor is configured to identify the valve hole sealing substitute from the photo, record the position of the valve hole sealing substitute on the wheel, and calculate the difference of the positions of the removal manipulator and the valve hole sealing substitute on the wheel; the rotating spindle drives the wheel to rotate so that the positions of the removal manipulator and the valve hole sealing substitute are superposed; and the removal manipulator is configured to remove the valve hole sealing substitute from the position, recorded by the processor, of the valve hole sealing substitute on the wheel.

The device further comprises a laser ranging sensor, and the laser ranging sensor and the color identification camera are respectively arranged behind the removal manipulator and configured to be in data connection with the processor.

The valve hole sealing substitute has a black surface.

The device further comprises a rotary encoder, which is configured to be in data connection with the processor and accurately calculate the phase angle of the valve hole sealing substitute on the wheel according to the photo and the measurement result of the laser ranging sensor.

The removal manipulator is controlled by servo drive and configured to move forward and backward, up and down.

The removal manipulator is configured to release the valve hole sealing substitute after the valve hole sealing substitute is removed.

In other aspect of the present invention, further provided is a method for removing a valve hole sealing substitute from a hub using the device described above, the method comprising the steps: (1) a roller bed of a production line conveying the hub to a console, the industrial camera taking a photo from the front of the hub and transmitting the photo to the processor, and the processor identifying the valve hole sealing substitute from the photo, recording the position of the valve hole sealing substitute on the wheel, and calculating the difference of the positions of the removal manipulator and the valve hole sealing substitute on the wheel; (2) the rotating spindle driving the wheel to rotate so that the positions of the removal manipulator and the valve hole sealing substitute are superposed; and (3) the removal manipulator removing the valve hole sealing substitute from the position, recorded by the processor, of the valve hole sealing substitute on the wheel.

In a preferred aspect of the present invention, in step 1, the method further comprises a step of accurately calculating the phase angle of the valve hole sealing substitute on the wheel according to the photo and the measurement result of the laser ranging sensor.

The technical solution of the present invention has the following advantages:

(1) The device can realize a rough positioning function on the hub and the valve hole sealing substitute by adopting the industrial camera as a detecting element for identification and positioning of the hub.

(2) The device can accurately identify and position the black valve hole sealing substitute by adopting the color identification camera.

(3) The device can realize precise positioning on the valve hole sealing substitute by adopting the rotary encoder.

(4) The removal manipulator of the device is controlled by servo drive, so that the device has the characteristics of fast and stable operation and accurate and reliable positioning.

(5) The device can accurately measure the distance between the valve hole sealing substitute and the removal manipulator by adopting the laser ranging sensor, thereby providing accurate data for accurate removal.

(6) The installation of the collection container can ensure effective collection of the removed valve hole sealing substitute, reduce the loss and reduce the procurement cost.

(7) The device is equipped with a shield, which achieves the effects of proofing dust, protecting the precision sensor and effectively isolating light, thereby reducing the influence of natural light on the camera.

The device solves the problem of relying on personnel to remove the valve hole sealing substitute, improves the labor productivity, and improves the automation of the hub production process.

BRIEF DESCRIPTION OF THE DRAWING

FIG. 1 shows a device for automatically removing an aluminum alloy hub valve hole sealing substitute.

In which: 1—collection container, 2—laser ranging sensor, 3—color identification camera, 4—removal manipulator, 5—valve hole sealing substitute, 6—shield, 7—rotary encoder, 8—clamping spindle, 9—aluminum alloy hub, 10—industrial camera.

DETAILED DESCRIPTION OF THE EMBODIMENTS

Embodiment 1: A Device for Automatically Removing an Aluminum Alloy Hub Valve Hole Sealing Substitute The device for automatically removing an aluminum alloy hub valve hole sealing substitute will be described in detail below in combination with the accompanying drawing.

The device for automatically removing an aluminum alloy hub valve hole sealing substitute comprises a collection container 1, a laser ranging sensor 2, a color identification camera 3, a removal manipulator 4, a valve hole sealing substitute 5, a shield 6, a rotary encoder 7, a clamping spindle 8, an aluminum alloy hub 9 and an industrial camera 10.

According to the device for automatically removing an aluminum alloy hub valve hole sealing substitute, the hub 9 entering the shield 6 is first positioned by the industrial camera 10, and then the hub 9 is clamped onto the spindle 8.

The industrial camera 10 begins to identify the valve hole sealing substitute 5. After the valve hole sealing substitute is detected, the position of the valve hole sealing substitute on the wheel is recorded, and the phase difference between the valve hole sealing substitute 5 and the removal manipulator 4 is calculated.

The spindle 8 rotates a phase difference angle calculated by the rotary encoder 7 installed on the spindle 8, and rough positioning between the valve hole sealing substitute 5 and the removal manipulator 4 is completed.

After the phase angle of the valve hole sealing substitute 5 is roughly positioned, the color identification camera 3 fixedly installed behind the removal manipulator 4 accurately positions the black valve hole sealing substitute 5, so that the phase angle of the valve hole sealing substitute 5 is superposed with the phase angle of the removal manipulator 4.

The distance between the black valve hole sealing substitute 5 and the laser ranging sensor 2 is accurately measured by the laser ranging sensor 2, and the accurate displacement that the removal manipulator 4 advances is calculated through the distance parameter, so that the removal manipulator 4 can accurately remove the black valve hole sealing substitute 5.

After the removal manipulator 4 removes the black valve hole sealing substitute 5, the black valve hole sealing substitute 5 is collected into the container 1 by means of its own weight through retraction and release, so that the black valve hole sealing substitute 5 can be reused.

After the removal operation is completed, the device for automatically removing an aluminum alloy hub valve hole sealing substitute is prepared for next removal operation instruction, and the hub sequentially enters the shield to remove the valve hole sealing substitute.

Embodiment 2: A Device for Automatically Removing an Aluminum Alloy Hub Valve Hole Sealing Substitute As described in Embodiment 1, when different types of hubs 9 enter the shield 6, each hub runs to the clamping spindle 8, the shape and size of the outer side of the hub 9 are roughly identified by the industrial camera 10, and the center hole of the hub 9 is clamped and positioned after being identified.

The industrial camera 10 compares the shape of the outer side of the hub 9 with a database of an industrial computer to roughly analyze the shape and size of the hub 9, then the black valve hole sealing substitute 5 is positioned and identified, and the phase angle difference between the black valve hole sealing substitute 5 and the removal manipulator 4 is calculated when the black valve hole sealing substitute 5 is detected. Subsequently, the clamping spindle 8 drives the hub 9 to rotate the phase angle difference, the angle of rotation is determined by the rotary encoder 7, and the longitudinal axes of the black valve hole sealing substitute 5 and the removal manipulator 4 are superposed and positioned.

Then, the black valve hole sealing substitute 5 is accurately positioned by the color identification camera 3, and the spatial position of the black valve hole sealing substitute 5 is transmitted to the removal manipulator 4. The laser ranging sensor 2 feeds accurate distance data back to the removal manipulator 4, so that the removal manipulator 4 can accurately remove the black valve hole sealing substitute 5 from the hub 9 under the servo drive control.

The device can be applied to hubs having the diameters of 12 to 24 inches. For example, before the device for automatically removing an aluminum alloy hub valve hole sealing substitute works, the position where the removal manipulator 4 is located is set to a 0° phase angle. The industrial camera 10 measures the diameter of the hub 9 to be 18 inches, then begins to identify the position of the black valve hole sealing substitute 5 on the hub 9, and calculates the phase angle difference which should be 0° to 180°. According to the phase angle difference, the clamping spindle 8 drives the hub 9, and the rotary encoder 7 calculates the angle so that the rotation angle is equal to the phase angle difference. At this time, the positions of the removal manipulator 4 and the black valve hole sealing substitute 5 are substantially superposed, and then the color identification camera 3 performs precise positioning to ensure that the black valve hole sealing substitute 5 can be accurately removed. According to the actual production situation, the device can remove 900 black valve hole sealing substitutes 5 in one hour, which completely meets the requirements of the production line, the success rate of removal is as high as 99.99%, and almost no substitute is missing. By actual production verification, the device can completely replace manual operation, and missing removal due to human omission is therefore avoided.

The invention claimed is:

1. A device for removing a valve hole sealing substitute from a hub, comprising:

an industrial camera, a removal manipulator, a rotary spindle, a frame and a console, wherein the console is installed on the frame, the console is connected to a production line by a roller bed, a color identification camera and the industrial camera are respectively installed on the frame and aligned with the console, the rotary spindle is installed below the console and configured to drive the hub above the console to rotate, and the removal manipulator is arranged above the console.

2. The device for removing a valve hole sealing substitute from a hub according to claim 1, wherein the rotating spindle is configured to drive the hub to rotate, the industrial camera is configured to take a photo from a front of the hub and transmit the photo to a processor, and the processor is configured to identify the valve hole sealing substitute from the photo, record a position of the valve hole sealing substitute on a wheel, and calculate a difference of positions of the removal manipulator and the valve hole sealing substitute on the wheel; the rotating spindle drives the wheel to rotate so that the positions of the removal manipulator and the valve hole sealing substitute are superposed; and the removal manipulator is configured to remove the valve hole sealing substitute from the position, recorded by the processor, of the valve hole sealing substitute on the wheel.

3. The device for removing a valve hole sealing substitute from a hub according to claim 1, wherein the device further comprises:

a laser ranging sensor, and the laser ranging sensor and the color identification camera are respectively arranged behind the removal manipulator and configured to be in data connection with the processor.

4. The device for removing a valve hole sealing substitute from a hub according to claim 1, wherein the valve hole sealing substitute has a black surface.

5. The device for removing a valve hole sealing substitute from a hub according to claim 1, further comprising:

a rotary encoder in data connection with the processor and calculate a phase angle of the valve hole sealing substitute on the wheel according to the photo and a measurement result of the laser ranging sensor.

6. The device for removing a valve hole sealing substitute from a hub according to claim 1, wherein the removal manipulator is controlled by servo drive and configured to move forward and backward, up and down.

7. The device for removing a valve hole sealing substitute from a hub according to claim 1, wherein the removal manipulator is configured to release the valve hole sealing substitute after the valve hole sealing substitute is removed.

* * * * *